(No Model.) 4 Sheets—Sheet 1.
C. H. TONDEUR.
METHOD OF AND APPARATUS FOR MANUFACTURE OF WIRE GLASS.
No. 538,393. Patented Apr. 30, 1895.
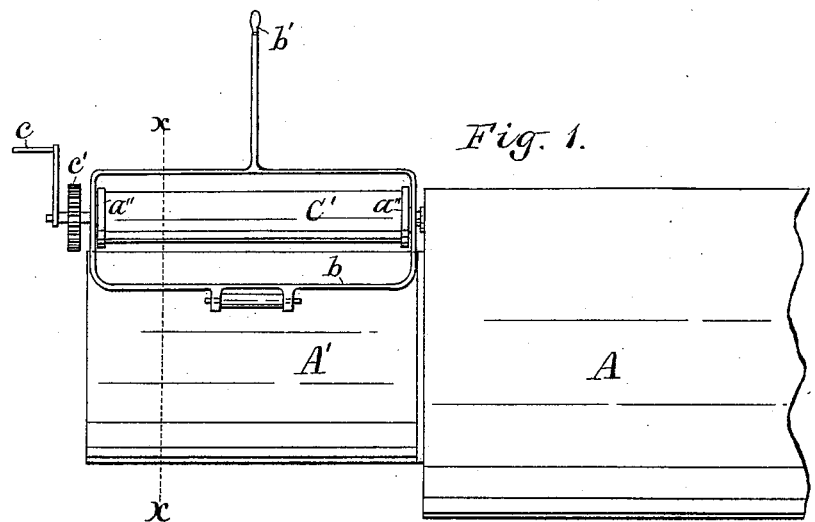
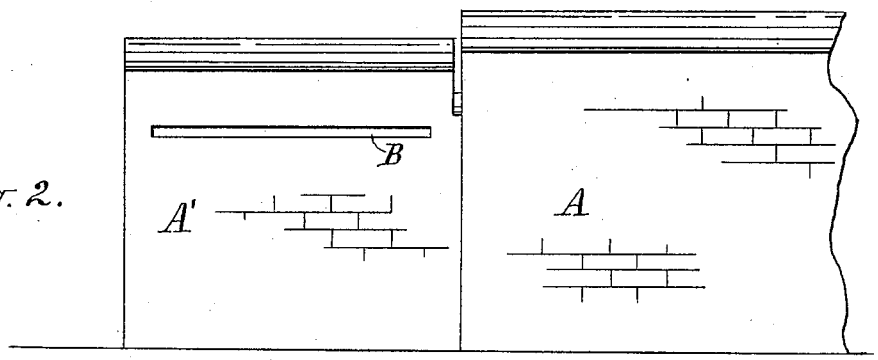
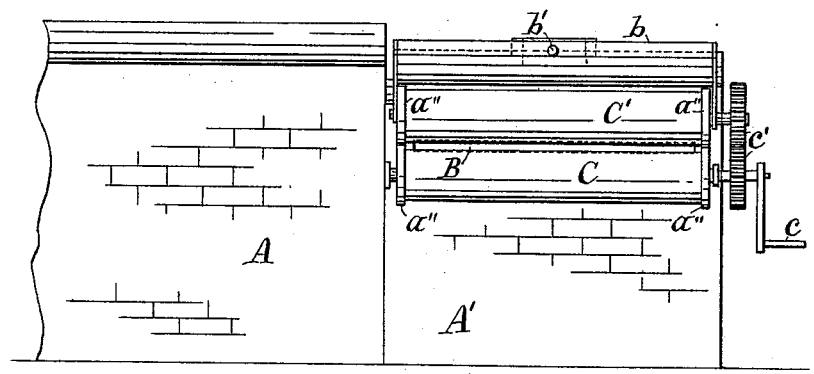
Witnesses:
Mark W. Dewey
R. S. Dewey
Inventor.
Cleon H. Tondeur
By C. H. Duell
his Attorney.

(No Model.) 4 Sheets—Sheet 2.
C. H. TONDEUR.
METHOD OF AND APPARATUS FOR MANUFACTURE OF WIRE GLASS.
No. 538,393. Patented Apr. 30, 1895.
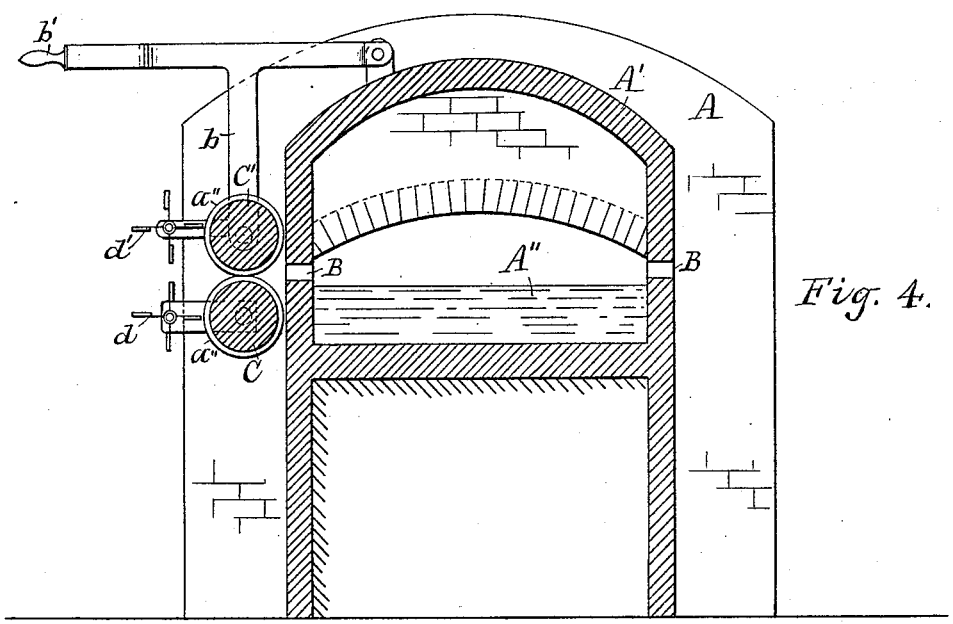
Fig. 4.
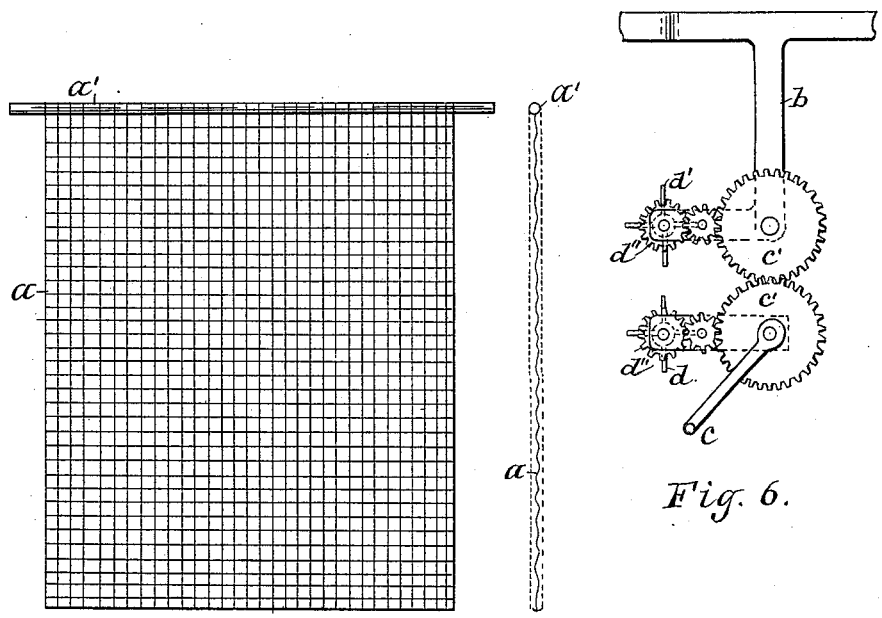
Fig. 5.
Fig. 6.
Witnesses:
Mark W. Dewey
R. S. Dewey
Inventor.
Cleon H. Tondeur
By C. H. Duell
his Attorney.

(No Model.) 4 Sheets —Sheet 3.
C. H. TONDEUR.
METHOD OF AND APPARATUS FOR MANUFACTURE OF WIRE GLASS.

No. 538,393. Patented Apr. 30, 1895.

Witnesses.
Mark W. Dewey
A. S. Dewey

Inventor.
Cleon H. Tondeur
By C. H. Duell
his Attorney.

(No Model.)

C. H. TONDEUR.
METHOD OF AND APPARATUS FOR MANUFACTURE OF WIRE GLASS.

No. 538,393. Patented Apr. 30, 1895.

Witnesses:
Mark W. Dewey
R. S. Dewey

Inventor.
Cleon H. Tondeur
By C. H. Duell
his Attorney.

UNITED STATES PATENT OFFICE.

CLEON H. TONDEUR, OF CANASTOTA, NEW YORK.

METHOD OF AND APPARATUS FOR MANUFACTURE OF WIRE-GLASS.

SPECIFICATION forming part of Letters Patent No. 538,393, dated April 30, 1895.

Application filed February 1, 1895. Serial No. 536,926. (No model.)

*To all whom it may concern:*

Be it known that I, CLEON H. TONDEUR, of Canastota, in the county of Madison, in the State of New York, have invented new and useful Improvements in Methods of and Apparatus for the Manufacture of Wire-Glass, of which the following, taken in connection with the accompanying drawings, is a full, clear, and exact description.

My invention relates to the method of and apparatus for the manufacture of glass for skylights, &c., in which wire netting or fabric is embedded to strengthen it.

The object of my invention is to provide a method of and apparatus for the manufacture of such glass, whereby a cheaper and improved article may be produced.

My invention consists in the combination with the melting tank, of a gathering chamber at one end of said tank, a horizontal slot in each side of the gathering chamber, rollers on opposite sides of one of said slots, and means whereby said rollers may be moved relatively to each other; and my invention consists in other combinations hereinafter described and specifically set forth in the claims.

Figure 7:
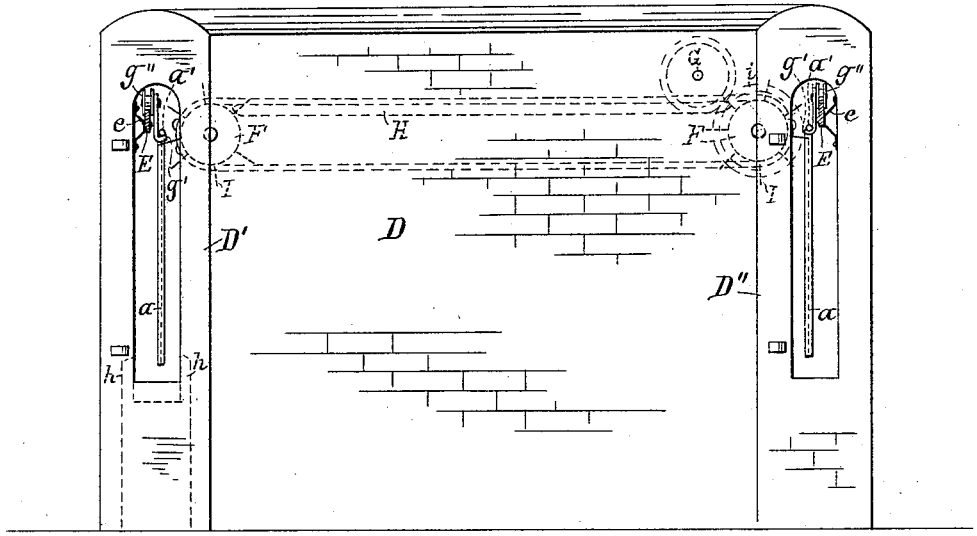
Figure 8:
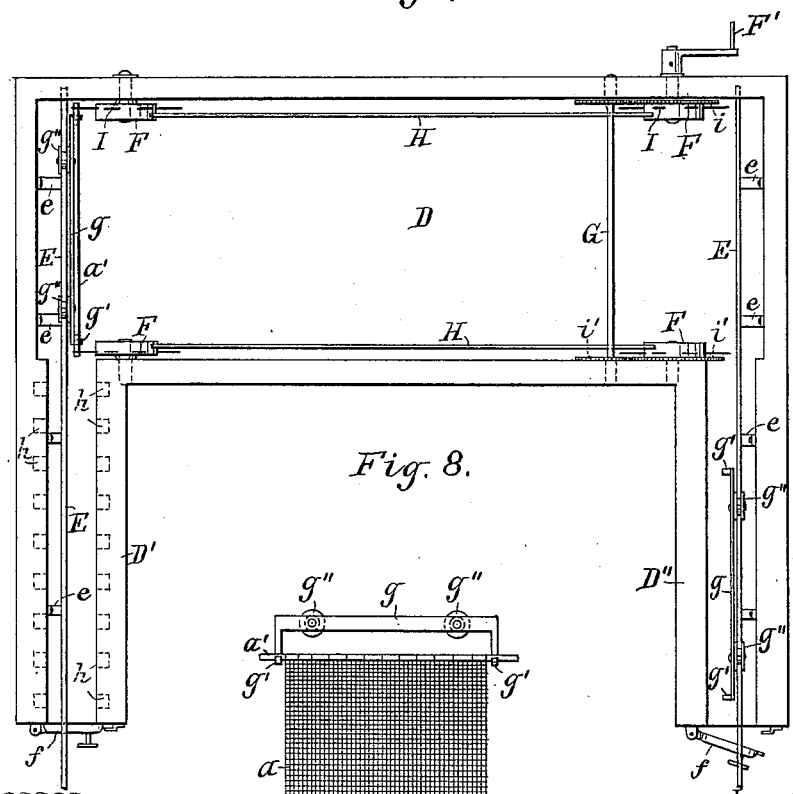
Figure 9:
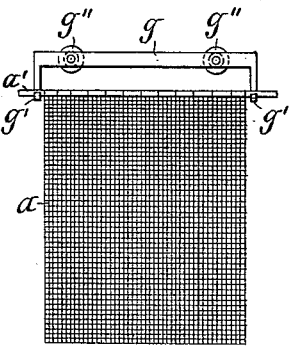
Figure 10:
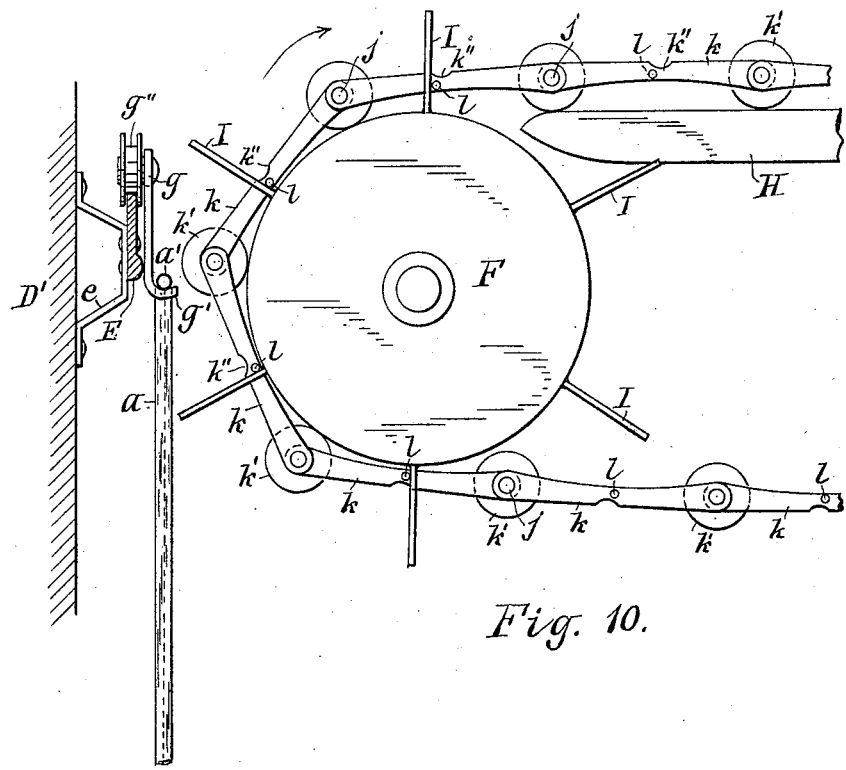
Figure 11:
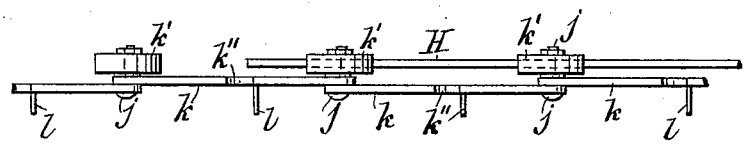

In the drawings accompanying this specification and forming a part hereof, Figure 1 is a top plan view of a portion of the melting-tank, the gathering-chamber, and the rollers. Fig. 2 is a side view of the same. Fig. 3 is a view of the opposite side, showing the rollers. Fig. 4 is a sectional view on line $x\,x$ of Fig. 1. Fig. 5 shows a side and edge view of the netting attached to a pipe or rod before it is dipped or covered with glass. Fig. 6 shows the gearing between the two rollers, also gearing and revolving fans for cooling the sheet as it passes from between the rollers. Fig. 7 is a side elevation of the annealing-furnace. Fig. 8 is a top plan view of the same with the top thereof removed to show the interior. Fig. 9 is a view of the plate-carrier holding a plate or sheet of glass detached from the track. Fig. 10 is an enlarged view of the plate-carrier, chain conveyer, &c.; and Fig. 11 is a top plan view of a portion of the conveyer-chain and the track.

Referring specifically to the drawings, A is the melting tank, beneath which is a furnace, of any suitable and well known form of construction, to heat the tank.

A' is the gathering chamber extending from one end of the tank. Both the tank and chamber are covered by an arched roof. The said chamber is preferably narrower than the tank and somewhat lower and communicates with the tank. The wall between the tank and the chamber, above the opening between the receptacles, is preferably made double, as shown in the drawings, so that it may better stand the heat.

On each side of the gathering chamber A' just above the level of the melted glass, A'', is a horizontal slot, B, of suitable length and width for the purpose of admitting the wire fabric, $a$, on one side of the chamber, and withdrawing it from the chamber on the opposite side coated with the glass in which it is dipped while in the chamber.

In order to easily hold and handle the piece of netting before and after it is dipped, I attach a pipe or rod, $a'$, to one edge, as shown clearly in the two views of Fig. 5 of the drawings. The rod or pipe is longer than the width of the netting and the slots are somewhat longer than the pipe. The pipe is introduced first through the slot on the right hand side of the chamber, shown in Fig. 2, and is pushed or drawn by hooks or tongs across the chamber toward the opposite slot, through which it is drawn with the netting secured thereto covered with a thick covering on both sides of soft glass. Now, in order that this glass may be made of even thickness, it is immediately, or as it is drawn from the chamber, passed between two rollers, C, and C', which I will now proceed to describe.

The rollers extend horizontally and parallel with each other, one being above and the other below the slot. Any suitable means may be employed to adjust the distance between them for various thicknesses of glass, but I have shown simply rims or collars, $a''$, on the ends of the rollers to hold them apart. The lower roller, C, is stationary or turns in stationary brackets at each end while the upper roller is movable toward and from the lower roller— that is, it is adapted to be raised, when grappling for the pipe attached to the wire glass, and lowered, when drawn out between the rollers. In order to raise the said roller, I fulcrum it in a swinging frame, b, hinged to the roof of the chamber, A', and provide the frame with a handle b'. The rollers are rotated by means of a crank, c, and gear wheels, c', on the ends of the rollers which intermesh, the crank being keyed to the shaft of the lower roller.

For the purpose of cooling the glass as it is drawn from between the rollers, I may provide any suitable and well known means for circulating the air, but I prefer, and show in Figs. 4 and 6, two rotatable fans d and d', having each four blades, one fan—the lower one—d, being mounted to turn in stationary brackets below the junction of the two rollers, and the other, or upper fan, d', being mounted to turn in projections on the swinging frame, b, so that it will be raised and lowered with the upper roller. One end of each of the shafts on which the fans are mounted is provided with a pinion, d'', and these pinions are rotated by intermediate pinions journaled in the said bracket and frame and intermeshing with the gear wheels, c', on the ends of the rollers. When the rollers are turned to move and press the glass, the fans are revolved to cool it on both sides. One of the rollers may be ribbed or corrugated, if desired.

After the sheet or plate of wire glass is withdrawn from the rolls it is passed through an annealing oven for the purpose of straightening it.

The main body of the annealing oven, D, is rectangular and oblong. At each end and extending outward from one side of the oven is a narrow chamber. The narrow chamber, D', on the left hand end of the oven is that into which the sheet of wire glass is first introduced, and the other chamber, D'', on the right hand end of the oven is that from which the said sheet is drawn after it has passed through the body of the oven. Said narrow chambers are each provided with a track, E, which is secured to the sides of the chamber by brackets, e, e, &c. The said tracks extend straight through into, and entirely across the oven near the top thereof and also through the openings in the ends of the chambers above the doors, f, f, thereof. On each of these tracks is a truck consisting of a bar, g, with a depending hook, g', at each end and two wheels g'', to travel on said track. These trucks support the sheets of wire glass; the hooks holding the pipe, a', on each side of the sheet, as shown clearly in Figs. 7 to 10, inclusive, of the drawings.

A suitable furnace below the narrow chamber, D', generates heat, which is passed upward on each side into the said chamber by means of a series of flues, h, h, &c., in the walls thereof as indicated by dotted lines. After the sheet of wire glass, to be annealed or straightened, is suspended from the truck on the track, it is passed into the narrow chamber, D', which is highly heated and the door is closed. It is soon straightened by the heat and its weight and then it is passed into the main part of the oven which is somewhat wider than the pipe connected to the sheet of glass. The sheet is then carried face forward from one end of the oven to the opposite end by means of a chain conveyer to be hereinafter described. Then the conveyer automatically deposits the sheet upon the truck upon the right hand track, E, in position to receive it and it is drawn forward through the narrow chamber, D'', and through the doorway thereof. The sheets are passed successively through the oven in this manner, many of course passing therethrough at the same time.

The conveyer, for carrying the sheets or plates of wire glass from one track to the other consists of four wheels or pulleys, F, two at each end of the oven and on each side thereof, facing each other. These pulleys are fulcrumed in the walls of the oven, one of them being provided with a crank, F', on the outside of the oven, for operating the conveyer. The wheel provided with the crank has a gear wheel, i, keyed to its shaft, which gear wheel meshes with a gear wheel on a counter shaft, G, extending across the oven above and to one side of the said pulleys. Gear wheels, i', connect the opposite pulley with the said counter shaft, so that both pulleys are turned when the crank, F', is operated. The pulleys, F, at the other end of the oven are turned simultaneously by means of the pair of chains connecting them together. The chains are made up of links, k, rollers, k', at the junction of said links, and bolts, j, passing through the rollers and the ends of the links. Said links are each provided with a cavity, k'', in which one end of the pipe, a', may be supported. A pair of tracks, H, H, extend between the pulleys, one on each side of the oven for the rollers on the upper portions of the chains to roll on so that the chains will not sag while carrrying the sheets of glass.

Each of the pulleys, F, is provided with arms, I, I, &c., on their peripheries, which radiate therefrom a distance apart depending upon the length of the links in the chain. These arms pick up the pipe from the hooks of one truck, and deposit it upon the chain in the cavities provided for it, and when the pipe reaches the pair of pulleys at the other or right hand end of the oven, their arms receive the pipe and deposit it upon the hooks of the second truck, as clearly shown by the drawings. Pins, l, extending from the side of the links, bear upon these arms, I, I, &c., and prevent the slipping of the chains upon the pulleys and hold the links, with the cavities therein, in proper position for the reception of the ends of the pipe a'.

Having described my invention, what I claim as new, and desire to secure by Letters Patent, is—

1. In an apparatus for the manufacture of wire glass, the combination of a melting tank, a covered gathering chamber at one end of said tank, a horizontal slot in each side of the gathering chamber, rollers on opposite sides of one of said slots, and means whereby said rollers may be moved relatively to each other, as set forth.

2. In an apparatus for the manufacture of wire glass, the combination of a melting tank, a covered gathering chamber at one end of, and narrower than said tank, a horizontal slot in each side of the gathering chamber and opposite each other, rollers on opposite sides of one of said slots, and means whereby said rollers may be revolved and moved relatively to each other, as set forth.

3. In an apparatus for the manufacture of wire glass, the combination of a melting tank, a gathering chamber communicating with the tank, horizontal slots in opposite sides of the gathering chamber, rollers near and parallel with one of said slots, gear wheels on the ends of said rollers, a swinging frame holding one of said rollers, and means to operate said rollers, as and for the purpose set forth.

4. In an apparatus for the manufacture of wire glass, the combination of a melting tank, a gathering chamber communicating with the tank, horizontal slots in opposite sides of the gathering chamber, a stationary roller below and parallel with one of said slots, a roller above the first mentioned roller, a swinging frame for the upper roller adapted to raise the latter, gears on the ends of said rollers, and means whereby the rollers may be rotated, as set forth.

5. In an apparatus for the manufacture of wire glass, the combination of a melting tank, a gathering chamber at one end of, and narrower than said tank, a horizontal slot in each side of, the gathering chamber and opposite each other, rollers on opposite sides of one of said slots, a rotatable fan near each roller, and means whereby said rollers may be revolved and moved relatively to each other, as set forth.

6. In an apparatus for the manufacture of wire glass, the combination of a melting tank, a gathering chamber communicating with the tank, horizontal slots in opposite sides of the gathering chamber, a stationary roller below and parallel with one of said slots, a roller above the first mentioned roller, a swinging frame for the upper roller adapted to raise the latter, gears on the ends of said rollers, a rotatable fan below the plane of the junction of said rollers and parallel therewith, a second fan above said plane journaled in the swinging frame, and means whereby the rollers may be rotated, as set forth.

7. In an apparatus for the manufacture of wire glass, the combination of a melting tank, a gathering chamber communicating with the tank, horizontal slots in opposite sides of the gathering chamber, a stationary roller below and parallel with one of said slots, a roller above the first mentioned roller, a swinging frame for the upper roller adapted to raise the latter, gears on the ends of said rollers, a rotatable fan below the plane of the junction of said rollers and parallel therewith, a second fan above said plane journaled in the swinging frame, gearing for communicating motion from the roller gears to the fans, and means whereby the rollers may be rotated, as set forth.

8. In an apparatus for the manufacture of wire glass, the combination with a furnace and an annealing oven, narrow chambers at each end extending from one side thereof and communicating with the oven, tracks at each end extending through said chambers and oven, trucks on said tracks, an endless conveyer extending between the said tracks, and means for operating the same as and for the purpose described.

9. In an apparatus for the manufacture of wire glass, the combination with a furnace and an annealing oven, narrow chambers at each end extending from one side thereof and communicating with the oven, tracks at each end extending through said chambers and oven, trucks on said tracks, an endless conveyer on each side of the oven connected together, means for removing the plate from one truck and depositing it on the other automatically, and means for operating the same, as set forth.

10. In an apparatus for the manufacture of wire glass, the combination with a furnace and an annealing oven, narrow chambers at each end extending from one side thereof and communicating with the oven, tracks at each end extending through said chambers and oven, trucks on said tracks, pulleys at opposite ends and on opposite sides of the oven, endless chains on said pulleys, a counter shaft and gearing, arms radiating from said pulleys, and means for operating the conveyer, as set forth.

11. In an apparatus for the manufacture of wire glass, the combination with the furnace and an annealing oven, narrow chambers at each end extending from one side thereof and communicating with the oven, tracks at each end extending through said chambers and oven, trucks on said tracks, pulleys at opposite ends and on opposite sides of the oven, endless chains on said pulleys, a counter shaft and gearing, arms radiating from said pulleys, tracks between the pulleys on each side of the oven, and means for rotating the pulleys, as set forth.

12. In an apparatus for the manufacture of wire glass, the combination with a furnace and an annealing oven, narrow chambers at each end extending from one side thereof and communicating with the oven, tracks at each end extending through said chambers and oven near the top thereof, trucks on said tracks, pulleys at opposite ends and on opposite sides of the oven, endless chains on said pulleys provided with rollers, tracks between the pulleys on each side of the oven for the upper portions of the chains to bear upon, a counter shaft, gearing between the pulleys and the counter shaft, arms radiating from said pulleys, and means for rotating the pulleys, substantially as set forth.

In testimony whereof I have hereunto signed my name.

CLEON H. TONDEUR. [L. S.]

Witnesses:
H. M. SEAMANS,
MARK W. DEWEY.